(12) United States Patent
Beckman et al.

(10) Patent No.: US 8,387,004 B2
(45) Date of Patent: Feb. 26, 2013

(54) COMPOSITIONAL APPLICATION PROGRAMMING INTERFACE AND LITERAL SYNTAX

(75) Inventors: Brian C. Beckman, Newcastle, WA (US); Henricus Johannes Maria Meijer, Mercer Island, WA (US); Danny Van Velzen, Redmond, WA (US); Evgueni Zabokritski, Remond, WA (US)

(73) Assignee: Microsoft Corporation, Redmond, WA (US)

( * ) Notice: Subject to any disclaimer, the term of this patent is extended or adjusted under 35 U.S.C. 154(b) by 1541 days.

(21) Appl. No.: 11/673,149

(22) Filed: Feb. 9, 2007

(65) Prior Publication Data

US 2008/0196005 A1    Aug. 14, 2008

(51) Int. Cl.
*G06F 9/44* (2006.01)
(52) U.S. Cl. ......... 717/109; 717/116; 717/118; 717/119
(58) Field of Classification Search .................. None
See application file for complete search history.

(56) References Cited

U.S. PATENT DOCUMENTS

| | | | |
|---|---|---|---|
| 5,889,992 A | 3/1999 | Koerber | |
| 6,480,860 B1 | 11/2002 | Monday | |
| 6,550,057 B1* | 4/2003 | Bowman-Amuah | 717/126 |
| 6,609,158 B1 | 8/2003 | Nevarez et al. | |
| 6,684,261 B1* | 1/2004 | Orton et al. | 719/328 |
| 6,851,115 B1* | 2/2005 | Cheyer et al. | 719/317 |
| 6,895,581 B1 | 5/2005 | Chkodrov et al. | |
| 7,035,781 B1 | 4/2006 | Flake et al. | |
| 7,533,387 B1* | 5/2009 | Massoudi | 719/328 |
| 7,665,063 B1* | 2/2010 | Hofmann et al. | 717/111 |
| 7,802,260 B1* | 9/2010 | Quinn et al. | 719/313 |
| 2002/0144018 A1* | 10/2002 | Knutson et al. | 709/328 |
| 2002/0169842 A1* | 11/2002 | Christensen et al. | 709/206 |
| 2003/0115025 A1* | 6/2003 | Lee et al. | 703/1 |
| 2004/0006651 A1 | 1/2004 | Dani et al. | |
| 2004/0139423 A1 | 7/2004 | Boehm et al. | |
| 2004/0181778 A1 | 9/2004 | Tibazarwa | |
| 2004/0201600 A1 | 10/2004 | Kakivaya et al. | |
| 2004/0226027 A1* | 11/2004 | Winter | 719/328 |
| 2005/0022164 A1 | 1/2005 | Takacsi-Nagy | |
| 2005/0091256 A1 | 4/2005 | Rathakrishnan et al. | |
| 2005/0204368 A1* | 9/2005 | Ambekar et al. | 719/328 |
| 2005/0209840 A1 | 9/2005 | Baklashov et al. | |
| 2006/0150148 A1* | 7/2006 | Beckett et al. | 717/109 |
| 2008/0163265 A1* | 7/2008 | Flora | 719/328 |

FOREIGN PATENT DOCUMENTS

WO    0113282    2/2001

OTHER PUBLICATIONS

Paul F. Dubois, et al. Extending Python with Fortran. Computing in Science & Engineering—Scientific Programming. Sep./Oct. 1999. http://ieeexplore.ieee.org/search/srchabstract.jsp?arnumber=790589&isnumber=17171&punumber=5992&k2dockey=790589@ieeejrns&query=%28+%28+syntax%3Cin%3Eab+%29+%3Cand%3E+%28+extension%3Cin%3Eab+%29+%29%3Cand%3E+%28+object%3Cin%3Eab+%29&pos=1. Last accessed Sep. 21, 2006.

M. Papa, et al. Extending Java for package based access control. IEEE, 2000. http://ieeexplore.ieee.org/iel5/7224/19469/00898859.pdf?tp=&arnumber=898859&isnumber=19469. Last accessed Sep. 21, 2006.

Kamil Skalski. Syntax-extending and type-reflecting macros in an object-oriented language. 2005. http://nazgul.omega.pl/macros.pdf#search=%22syntax%20extension%20object%20oriented%20programming%20language%2Bpdf%22. Last accessed Sep. 21, 2006.

* cited by examiner

*Primary Examiner* — Isaac Tecklu

(57) ABSTRACT

A compositional application programming interface (API) permits non-sequential construct declaration independent of other API calls. A wrapper is applied to an imperative API to provide a compositional interface that enables arbitrary and autonomous construct declaration. Additionally, a literal syntax (e.g., code literals, graphic literals . . . ) affords a convenient declaration mechanism for such constructs.

18 Claims, 15 Drawing Sheets

DIM W =

DIM X =

DIM Y =

DIM Z =

US 8,387,004 B2

COMPOSITIONAL APPLICATION PROGRAMMING INTERFACE AND LITERAL SYNTAX

BACKGROUND

Computer programs are groups of instructions and organizational constructs that govern actions to be performed by a computer or other processor-based device. When a computer program is executed on computer hardware, the computer will behave in a predetermined manner by following the instructions of the computer program. Accordingly, the computer becomes a specialized machine that performs the tasks prescribed by the instructions. Computer programs can be generated by programmers manually and/or with assistance of development tools. Alternatively, programs can be created automatically by other programs.

A significant class of programs include programs that create other programs. Everyday programmers employ compilers, form designers and/or database application generators, which are examples of this class of programs. Further, games and other graphic-intensive applications dynamically create miniature programs that run concurrently inside graphics co-processors. In addition, business analysis, reporting and visualization tools often create other programs for specialized purposes as a side effect. Still further yet, a web server application that embeds scripts in HTML (HyperText Markup Language) pages is a program that creates a program (HTML page) that creates another program (scripts).

Generally speaking, the technology for creating programs is code generation. The input information for code generation can come from any number of sources. For instance, input information can be embedded statically in a code generator, housed in files or databases or provided by direct user input such as mouse actions in a designer tool. The output of code generation can be designed to execute immediately after being created, under control of the program that created it, or alternatively saved for later execution independent of the code generator.

Whether a standard program or a program that creates programs, application programming interfaces (APIs) can be utilized to aid development. APIs are source code tools that provide a set of services, routines, functions or the like employable by a computer program. These tools provide a convenient mechanism to extend program functionality and/or provide fundamental program building blocks. For example, code generation APIs can be employed to facilitate generation of programs that create programs.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to APIs modifications that facilitate computer programming. APIs can be generated in a manner that enables independent calls thereto. Stated differently, users need not be forced to call APIs in a particular manner dictated by a creator of the API. APIs can be constructed to support increased modularity, independence and composability. In addition, an abbreviated syntax is supported to further aid program development.

In accordance with one aspect of the subject disclosure, a wrapper is provided for imperative style APIs. The wrapper can provide a unique interface to or view for an imperative API. For example, the wrapper component can provide a compositional interface or view that enables users to compose or declare programmatic constructs in an independent fashion free from restrictions imposed by an associated imperative API.

In accordance with another aspect of the disclosure, a literal syntax is supported. For instance, constructs can be declared or define utilizing code and/or graphic literals. This provides users with an easy way to define programmatic constructs that can be translated behind the scenes to an alternate representation, if necessary.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are disclosed with respect to APIs that support independent and/or arbitrarily ordered calls. Wrappers can be applied to imperative APIs that require adherence to a rigid, sequential order of calls to provide a compositional interface or view. More particularly, API concerns can be separated or decoupled, for example such that imperative API constructs can be declared arbitrarily and/or autonomously. Furthermore, literal syntax such as code literals and/or graphic literals can be employed to facilitate construct declaration.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
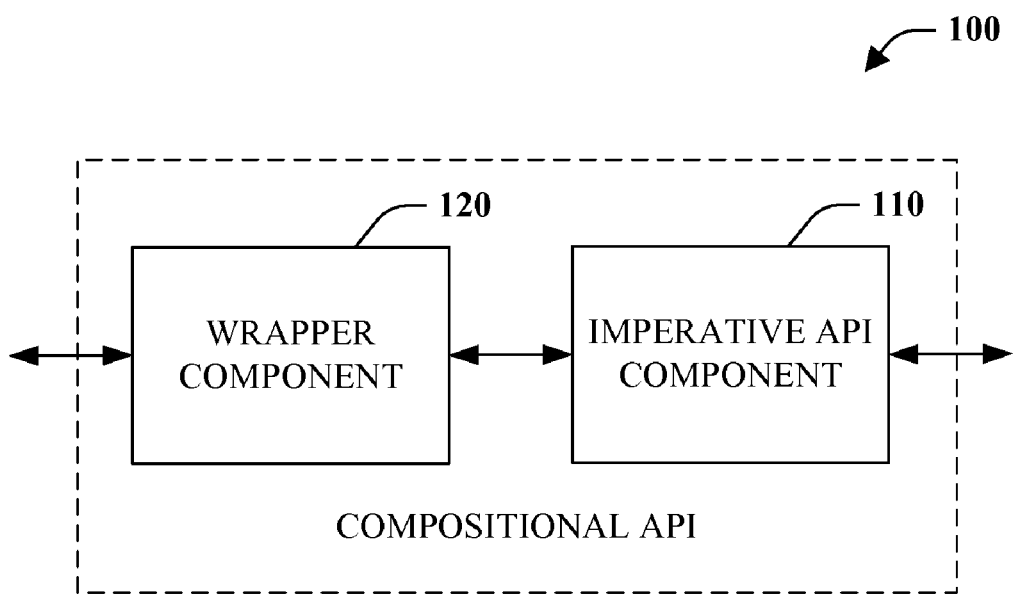
FIG. 1 is a block diagram of an application programming interface system.

Referring initially to FIG. 1, a block diagram of an application programming interface system 100 is depicted in accordance with an aspect of the claimed subject matter. System 100 includes an existing imperative API component 110 that requires adherence to a rigid, sequential order of calls, among other things. In other words, although the imperative API 110 includes a number of seemingly independent functions, routines or the like, in fact, it is necessary to call such functionality in a certain order. For example, consider construction of a nested structure. In this case, a container needs to be created before anything can be added to the container. If calls are not made in the proper order, such as by creating an expression to be added to a container (e.g., ExpressionContainer) before creation of the container, then nothing will work.

Often, the rigidity associated with the imperative API component 110 is not strictly necessary but rather stems from a creator of the API. In general, there are two groups of people associated with APIs; those that create APIs and those that use them. The users are thus the client or customer of the creators. The creators of imperative style APIs implement them in a manner that is most easy and logical for them. For example, authors of APIs such as those associated with code generation need to ensure a required structure is generated regardless of user actions. The easiest way to accomplish that is to force users into a particular sequence of calls. For instance, if element B is dependent on element A, then an API author will compel creation of element A prior to element B in accordance with a top-down approach. This enables the context for every element to be known upon creation. However, such a sequence is not logically required. Element B could be created first and element A created second, and subsequently elements A and B could be linked together in accordance with a bottom-up approach. In most instances, however, the required sequence is tailored to the convenience of the creators or authors of the APIs rather than to its users.

Wrapper component 120 can be coupled to the imperative API component 110 to afford a different interface or view thereto. In one embodiment, the wrapper component 120 can provide functionality to reduce the rigidity associated with direct interaction with the imperative API component 110. More specifically, imperative functionality can be analyzed and the wrapper component 120 can provide less constrained interaction with respect to some or all functionality provided by the imperative API 110. In some instances, this can lead to decoupling of mixed API functionality.

In accordance with one particular aspect of the claimed subject matter, the wrapper component 120 can provide a compositional interface, view thereto, or alternatively convert the imperative API component 110 to a compositional API. Compositional APIs support independent and/or arbitrarily ordered calls. Accordingly, clients or customers of such APIs are not forced into any sequence of calls to the API.

The benefits associated of such an approach are at least twofold. First, compositional APIs allow more flexibility to be able to mix and match things at will. More specifically, such APIs provide for increased modularity, independence and composability. Second, they support the way programmers think. Programmers tend not to build programs from the inside out. They tend to be much more organic in the way they generate code.

The degree of independence and/or composability provided by the wrapper component 120 can vary in accordance with the type and function of a particular API, among other things. More particularly, API concerns can be decoupled into those concerns that actually require a strict sequence of calls (e.g., third party restrictions, architecture . . . ) and those that do not. The wrapper component 120 can facilitate arbitrary interaction for some, if not all, concerns that do not require a strict sequence. For example, with respect to APIs relating to code generation concerns relating to declaration of constructs, objects, elements or the like can be separated from those pertaining to building objects, wherein the wrapper component 120 provides functionality associated with construct declaration.

Rather than interacting directly with the imperative API component 110, users of the API can interact with the wrapper component 120. The wrapper component 120 can provide additional methods, services, routines or the like associated with independent and/or arbitrary construct declaration, among other things. Users can call such mechanisms when generating constructs in this manner. The wrapper component 120 can interact with the imperative API component 110 to provide constructs to the API in the manner and/or order it expects them. The wrapper can also allow pass-through of other calls such as those related to building objects directly to the imperative API component 110. Accordingly, the wrapper component 120 can provide a compositional view on an imperative API component 110.

Figure 2:
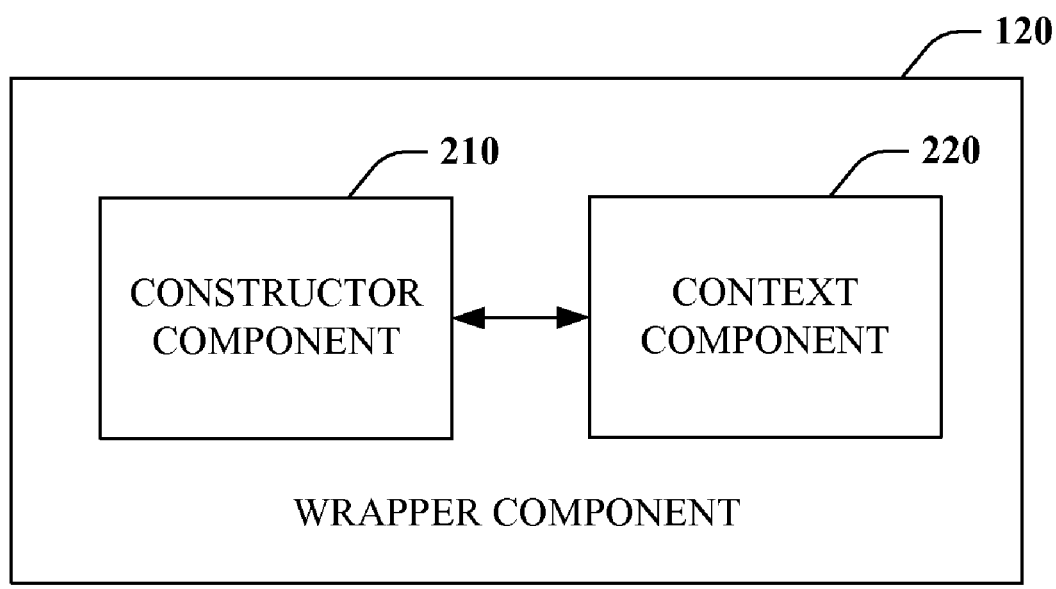
FIG. 2 is a block diagram of a representative wrapper component

FIG. 2 illustrates a representative wrapper component 120 in further detail in accordance with an aspect of the claimed subject matter. As previously described, the wrapper component 120 can provide a compositional interface or view on an imperative API. The wrapper component 120 includes constructor component 210 and context component 220 to enable autonomous and/or arbitrary creation of programmatic constructs.

The constructor component 210 provides mechanism to facilitate independent, context-free specification of programmatic elements, constructs or the like. For example, the constructor component 210 can correspond to a library, API, factory or the like that enables creation of an instance of a particular programmatic element independent of any contextual information. For example, there can be type factories, method factories, expression factories with respect to a code generation API. In accordance with one embodiment, constructor component can save instances of programmatic elements as objects or functions that expect and accept a context.

The context component 220 facilitates provisioning of context information to programmatic constructs concurrently with and/or subsequent to their creation via constructor component 210. This enables all cross references, dependencies and other contextual information to be associated with programmatic constructs or more particularly instances thereof. Similar to the constructor component 210, such functionality can be embodied in one or more libraries, APIs or the like. API users can utilize such functionality to specify context for a plurality of initially declared constructs.

Figure 3A:
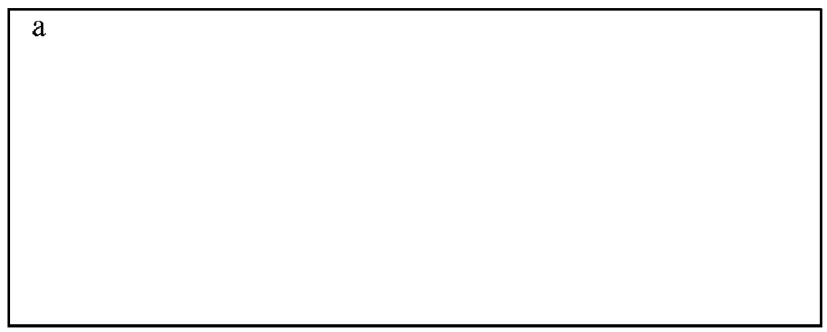
FIGS. 3a-e illustrate sequential construction of an addition expression in accordance with an imperative model.
Figure 3B:
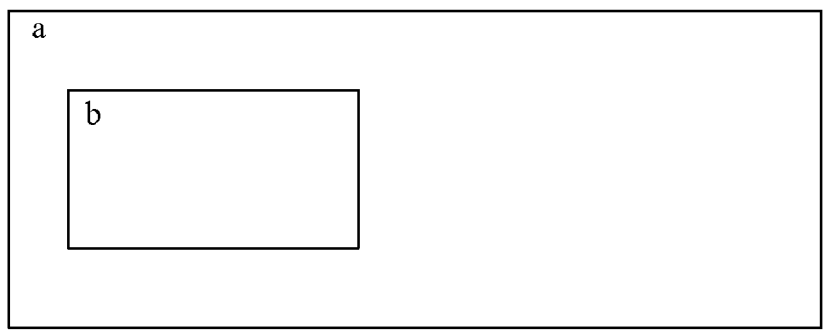
Figure 3C:
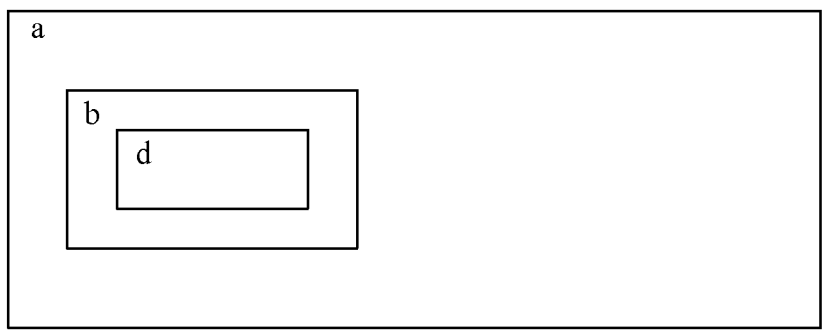
Figure 3D:
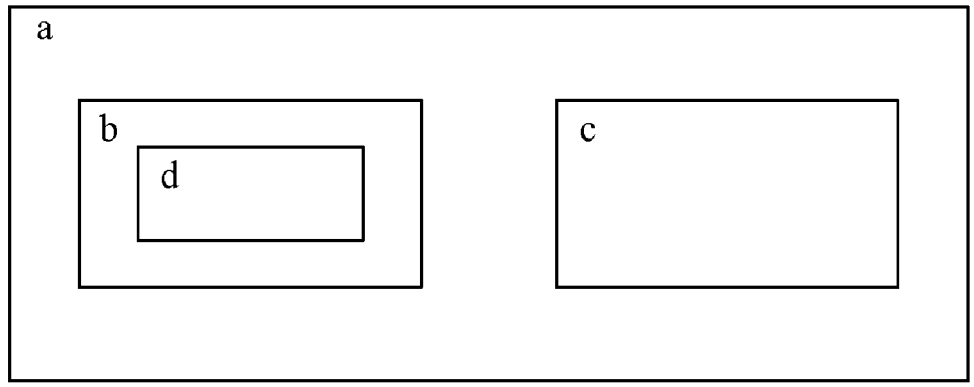
Figure 3E:
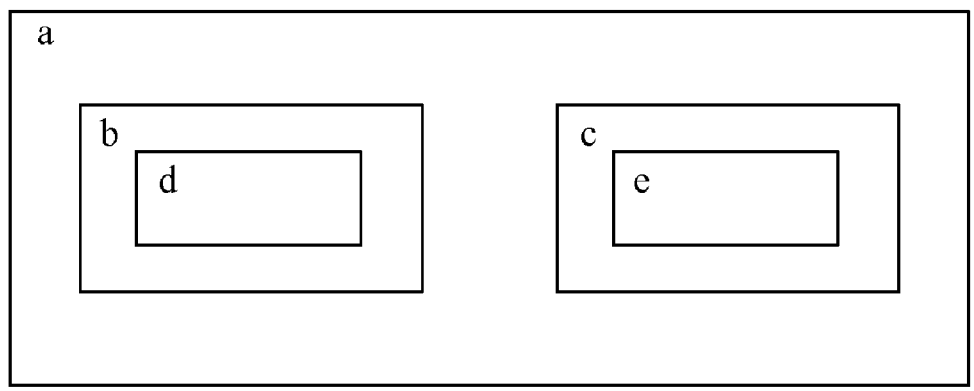
Figure 4:
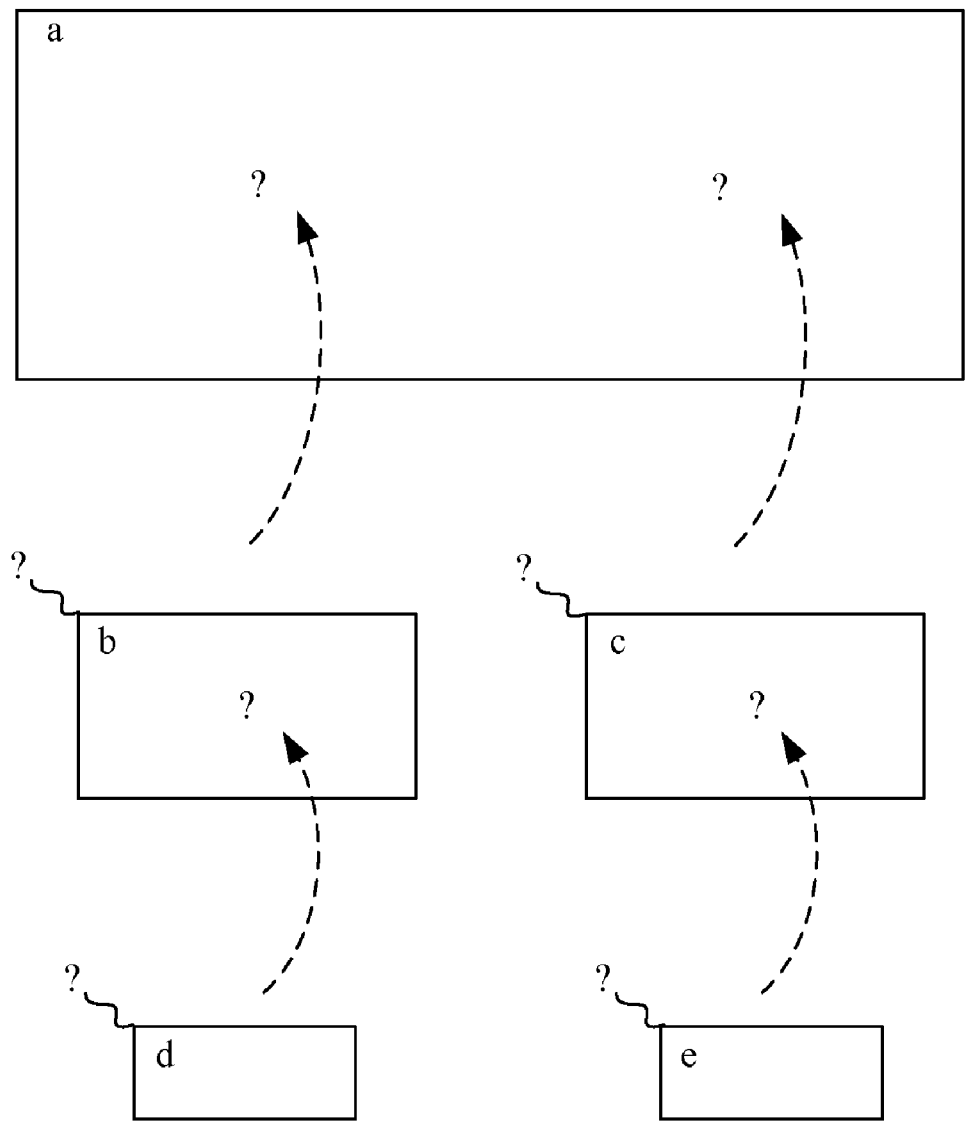
FIG. 4 provides a graphical representation of independent construct declaration in accordance with a compositional model.

FIGS. 3-4 and the following discussion relate to an example to provide further clarity and with respect to at least some of the foregoing aspects. It is to be appreciated that this is solely a simplified example and is not meant to limit the claimed subject matter. The intention is solely to aid understanding of the distinction between imperative and compositional APIs as it relates to the forgoing discussion.

By way of example, consider the simple expression "x+y." In essence, this is an add expression that contains to two parameters expressions that in this instance correspond to variables "x" and "y." An imperative API can force a user to specify parameters sequentially, for example from the top down as follows:

a=new Add Expresssion;
b=a.LeftExpression ( );
d=b.Variable ("x");
c=a.RightExpression( );
e=c.Variable("y");

The first statement identifies the expression container "a" as shown in FIG. 3a. Second, the left parameter expression "b" is added to the container "a" as depicted in FIG. 3b. The variable "x" represented by expression letter "d" can next be added to the container expression "b" as provided in FIG. 3c. Subsequently, the right parameter expression "c" can be added as shown in FIG. 3e to add expression container "a." Finally, the variable "y" represented by expression letter "e" can be added to the right parameter container "c." This is a serialized approach that requires a creation and maintenance of many variables to respect a required specification ordering.

A compositional approach can allow such expressions to be generated without a required ordering. Accordingly, the expressions can each be declared separately without initial specification of context information associated relations or cross-references between expressions. As depicted in FIG. 4, each expression container "a," "b,", "c," "d," and "e" can be declared separately. For illustrative purposes, each container includes a "dangling wire" that can be "connected" to another container to provide context. As a result, the containers, representative of programmatic constructs, can be generated in any order specified by a user. For example, a user can construct the same expression "x+y" in accordance with a bottom-up approach. In particular, first the variable expressions "d" and "e" are created, followed by the parameter expressions "b" and "c" and finally the larger add expression container "a." This could be denoted programmatically as follows:

Make Add Expression (
    Left Expression (var ("x"));
    Right Expression (var ("y"));
)

In this case, the wrapper component 120 of FIG. 1 can provide the functionality associated with "Make Add Expression," for example via a library. It can then interface with the imperative component 110 sequentially behind the scenes to create the expressions as required. However, users will be able to interact with the imperative component 110 independent of order requirements through the wrapper component 120.

Figure 5:
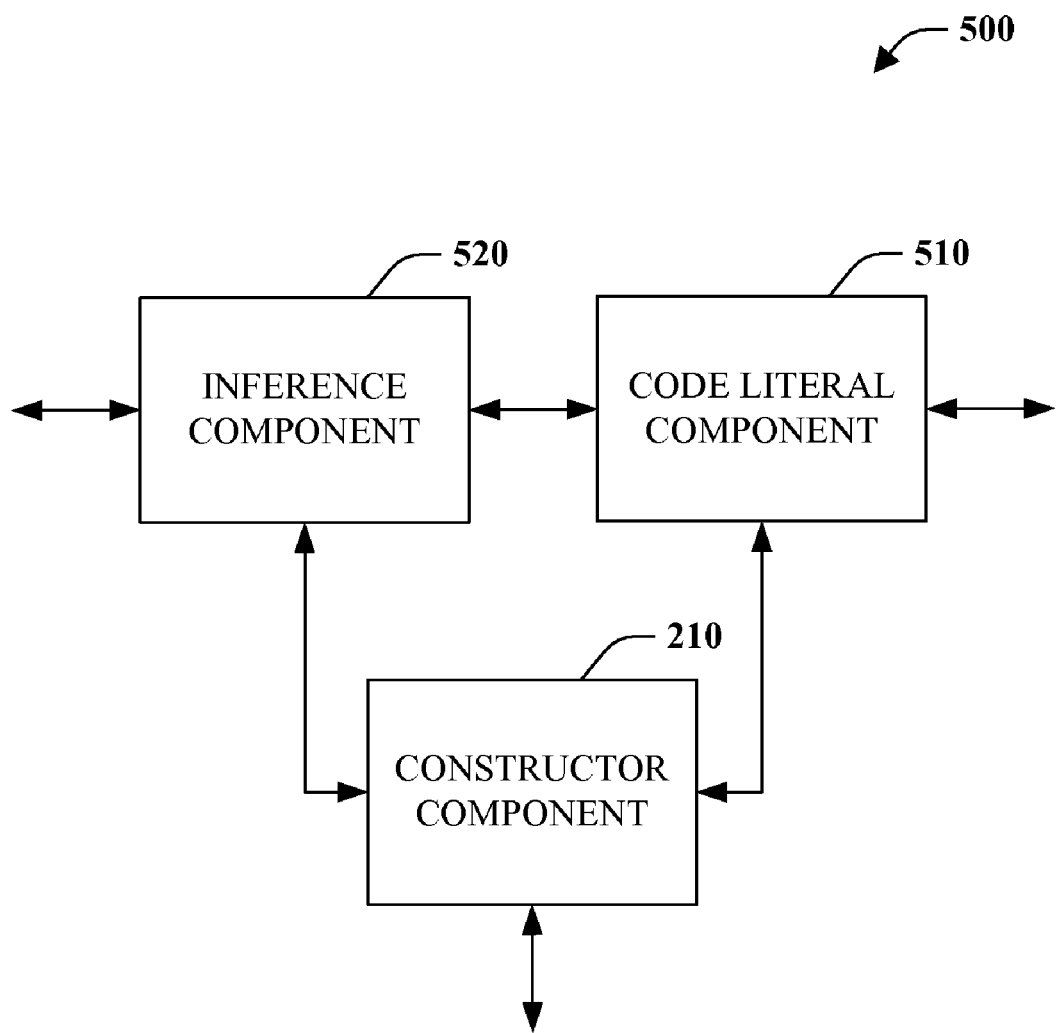
FIG. 5 is a block diagram of a system that facilitates program specification utilizing code literals.

Turning attention to FIG. 5, a system 500 that facilitates program specification is illustrated in accordance with an aspect of the claimed subject matter. As previously described with respect to FIG. 2, the constructor component 210 can provide one or more mechanisms to facilitate generation of instances of programmatic constructs. For example, one or more libraries, APIs, factories or the like can provide callable functionality related to such generation.

System 500 provides an extension to the manner in which constructs like expressions can be declared. More specifically, code literal component 510 is operable to identify and provision code literals to the constructor component 210. Code literals pertain to literal expressions of code desired to be inserted. Once again, one or more libraries, APIs, factories or the like can be provided to support such functionality. Among other things, this is extremely useful with respect code generation applications as particular segments of code to be produced can be explicitly specified. Recall the previous "x+y" example specified as follows:

Make Add Expression (
    Left Expression (var ("x"));
    Right Expression (var ("y"));
)

Rather than writing the expression in this manner, a code literal can specify the equivalent expression simply as ⌈x+y⌉ or where assigned to a variable as:

Dim Expression As ExpressionFactory=⌈x+y⌉.

The brackets (e.g., "⌈" and "⌉") or other syntax can be utilized to quote or indicate that the code therein should be assigned to a variable. Here, the variable "Expression" of type "ExpressionFactory" is assigned the value "x+y." The code literal component 510 can interact with the construct component 210 to ensure a variable or other construct is equal to an assign code literal. In one instance, it can utilize the already provided constructs to generate code for the equivalent version recognized by the constructor component 510, such as the longer identified version. In essence, code literal component 510 provisions another layer of programmatic abstraction via the specification of code literals.

The code literal component 510 and construct component 210 can also interact with type inference component 520 to allow specification to be even simpler. The type inference component 520 is a mechanism that can infer or otherwise determine types as a function of context. Accordingly, this can allow code literals to be expressed without associated types such as:

Dim Expression=⌈x+y⌉

Based on the code literal specification of "x+y," the type inference component 520 can infer that the type of "Expression" is "ExpressionFactory." This information can then be provided to one or more of code literal component 510 and constructor component 210 to enable the appropriate code to be generated.

It is also to be noted that code literal component 510 supports code literals with unquoted or de-referenced values. Unquoted portions of a code literal can be retrieved from the ambient environment. Consider the following code literal: ⌈x+⌊d⌋⌉. Here, the "d" is unquoted. Accordingly, its value will be retrieved by code literal component 510 from the environment. If "d" is assigned the value "y" for example denoted as: "d=⌈y⌉," then the expression will be equivalent to the previous expression, namely ⌈x+y⌉. Similarly, this expression is equivalent to the following longer version, perhaps supported by the constructor component 210.

```
d = var("y");
Make Add Expression (
    Left Expression (var ("x"));
    Right Expression (d);
)
```

As previously mentioned, the code literal component 510 can interact with the constructor component 210 to ensure the expression is properly constructed, for example by translating it to code recognized by the constructor component 210.

Figure 6:
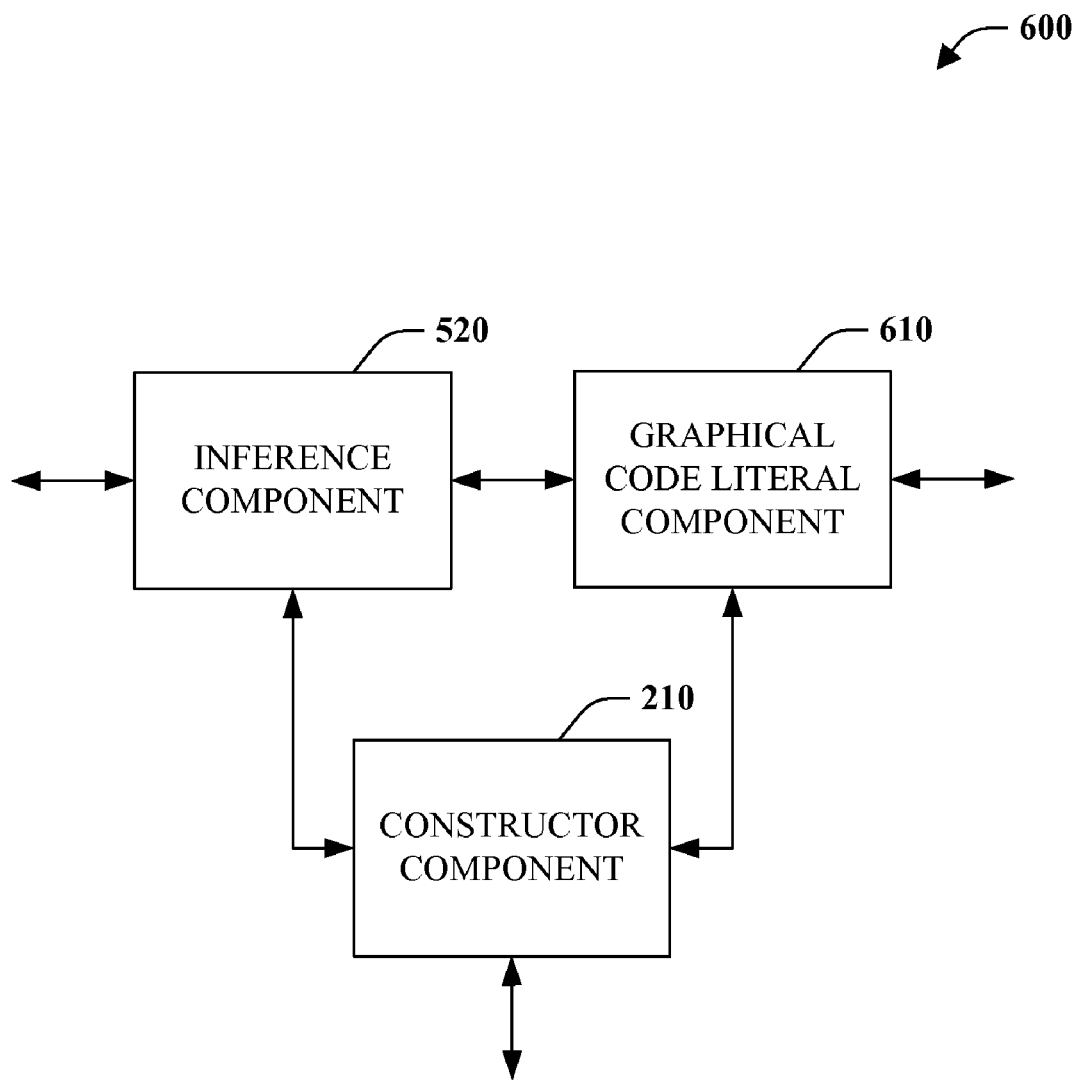
FIG. 6 is a block diagram of a system that facilitates program specification utilizing graphical literals.

Referring to FIG. 6, a system 600 is provided to facilitate programmatic specification in accordance with an aspect of the claimed subject matter. Similar to system 500 of FIG. 5, the system 600 includes the constructor component 210 and type inference component 520, as previously described. In addition, the system 600 includes a graphical code literal component 610 communicatively coupled with the constructor component 210 and the inference component 520. The graphical code literal component 610 provides support for another embodiment of code literals or a specific instance thereof, namely graphical literals. Graphical literals enable variables or other programmatic constructs to be assigned a value as a function of a graphical depiction. The graphical code literal component 610 can identify a graphical literal and produce or otherwise identify code associated with the literal. For example, the component 610 can translate an instance of a graphical literal directly to code supported by the constructor component 210 and provided it thereto. Still further yet, the type inference component 520 can be employed to infer types associated with assigned constructs, among other things, to further simplify what a user needs to specify.

In accordance with one embodiment, graphical literals can be provided to a user for use in code specification. Each provided literal can include or be linked to code needed for its generation. Where multiple graphical literals are specified, the graphical interpreter component can facilitate generating the connecting code. Further yet, graphical literals can also support both quoting and unquoting, or the like, similar to the functionality with respect to code literals. This can facilitate reuse of graphical literals, among other things.

Referring to FIG. 7*a-d*, a number of graphical literal examples are provided to aid understanding. More specifically each figure provides an example of variable assignment utilizing graphical literals. Note that variable types are not specified as they can be inferred from each graphical literal and/or other context information.

Figure 7A:
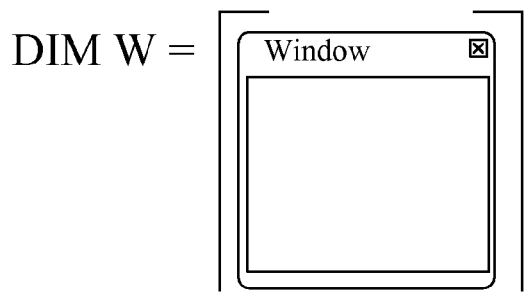
FIGS. 7a-d illustrate a number of exemplary graphical literals in the context of variable assignment.

FIG. 7*a* depicts specification of a variable "W" utilizing a graphical literal corresponding to a graphical window. Here, the graphical window can be drawn by a user or selected from a plurality of potential graphic literals, among other things. The window is surrounded by brackets to indicate that the graphic is to be interpreted as a literal. However, these brackets may not always be necessary.

Figure 7B:
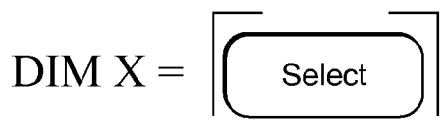

FIG. 7*b* shows assignment of a variable "X" utilizing a graphic literal corresponding to a button. Again, the button is quoted utilizing brackets to indicate that the variable "X" should have a value corresponding to the button.

Figure 7C:
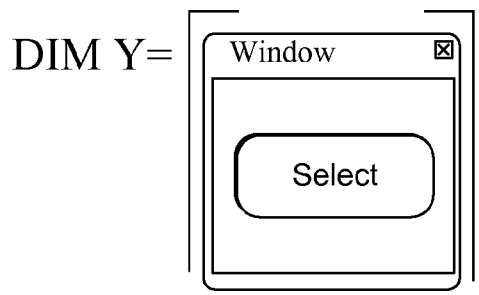
Figure 7D:
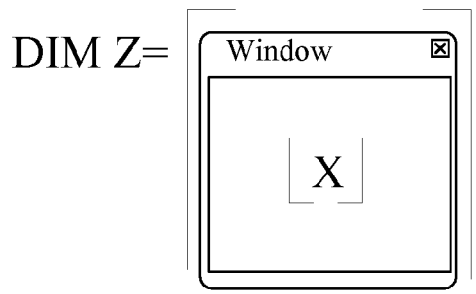

Multiple graphical literals can be combined to specify a variable. FIG. 7*c* illustrates use of multiple literals, wherein the graphical literals of FIGS. 7*a* and *b* are combined and assigned to variable "Y." FIG. 7*d* depicts an equivalent assignment with respect to variable "Z." However, here the variable "X" is inside the graphical window in an unquoted form. This indicates that the value of "X" should be specified within the window. Since the value of "X" is a button, the values of variables "Y" and "Z" are the same.

It is to be appreciated that other mechanisms can be employed to facilitated code specification including the foregoing aspects, among other things. For example, intelligent assistance can be afforded to provide code suggestions to users or auto-fill portions of code. Furthermore, syntax coloring can be utilized to aid program specification and comprehension. In general, programming utilizing APIs and literal syntax associated therewith can be accomplished in a manner similar an integrated development environment (IDE) including like mechanisms.

Figure 8:
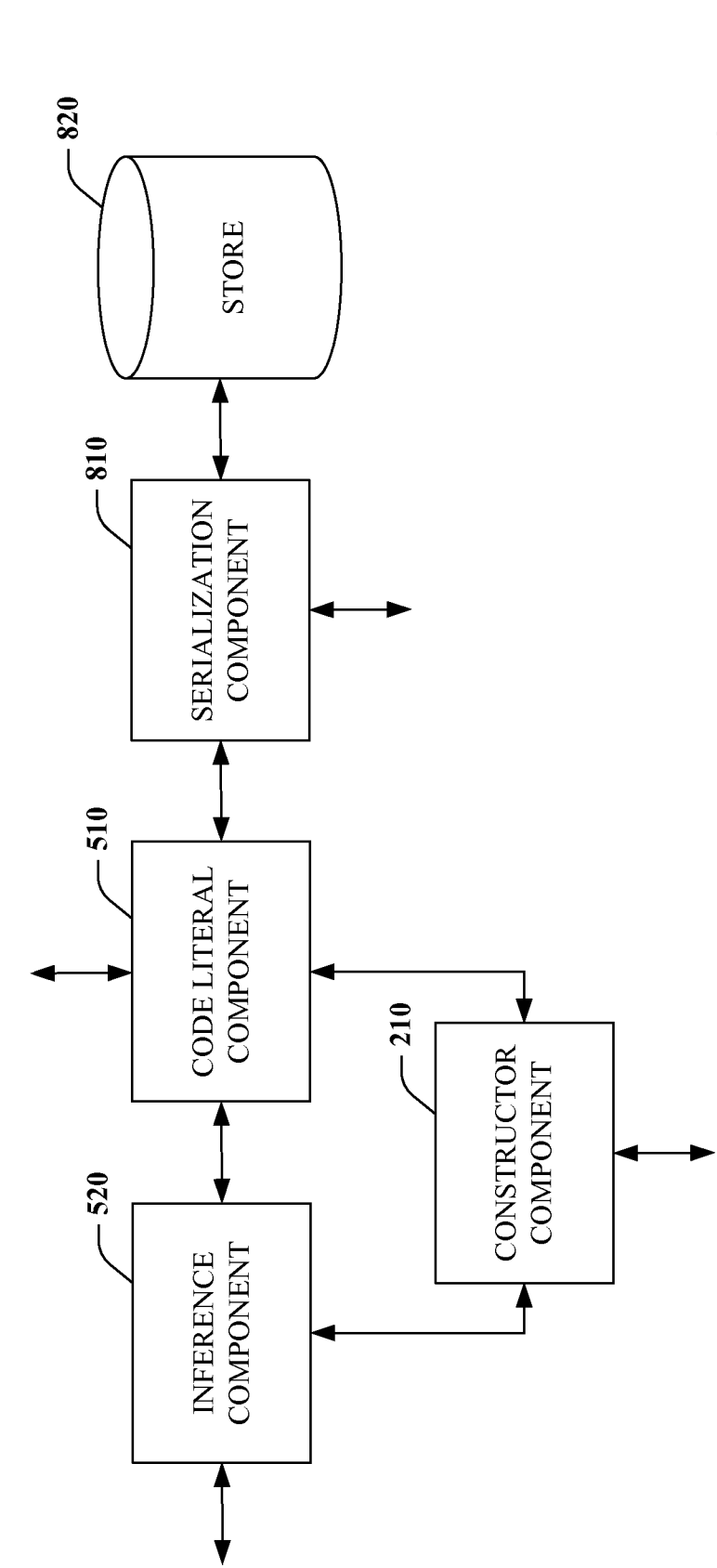
FIG. 8 is a block diagram of a programming system that facilitates code literal serialization.

Turning to FIG. 8, a programming system 800 is illustrated in accordance with yet another aspect of the claimed subject matter. Similar to system 500, system 800 includes the constructor component 210, code literal component 510 and type inference component 520, as previously shown and described. In addition, the system 800 includes a serialization component 810.

The serialization component 810 is operable to serialize and/or deserialize literals among other programmatic constructs to and from a data store 820. In this manner, literals can be specified with respect to references to databases or storage mechanisms. More particularly, initially generated literals can be serialized to the data store 820. Subsequently, code can employ these literals via reference thereto. For example, a calculator program could have code that implements calculator buttons persisted in a database. When the calculator initializes, it can read code in from a database as code literals, interpret and bind it to user interface buttons such that when the buttons are pressed or otherwise selected, the code is executed.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art. It is also to be noted that although APIs can related to code generation applications including compilers, other compilers can be employed to perform functionality associated with the above-described components. For example, a compiler can facilitate transformation of code specified in a compositional manner to an imperative manner associated with a particular API. Additionally or alternatively, a compiler can be employed to aid translation of literal syntax to more conventional code. Further yet, a compiler can determine a value associated with an unquoted element from an ambient environment and replace the unquoted element with the value. As will be appreciated from a more detailed example provided infra, compiler can also utilized and benefit from the same functionality it helps implement. For example, the compiler can take advantage of a compositional API to weave code-generation code together in sophisticated ways.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, such mechanisms can be employed to facilitate optimal decoupling of API functionality and/or type inference related to literals.

Figure 9:
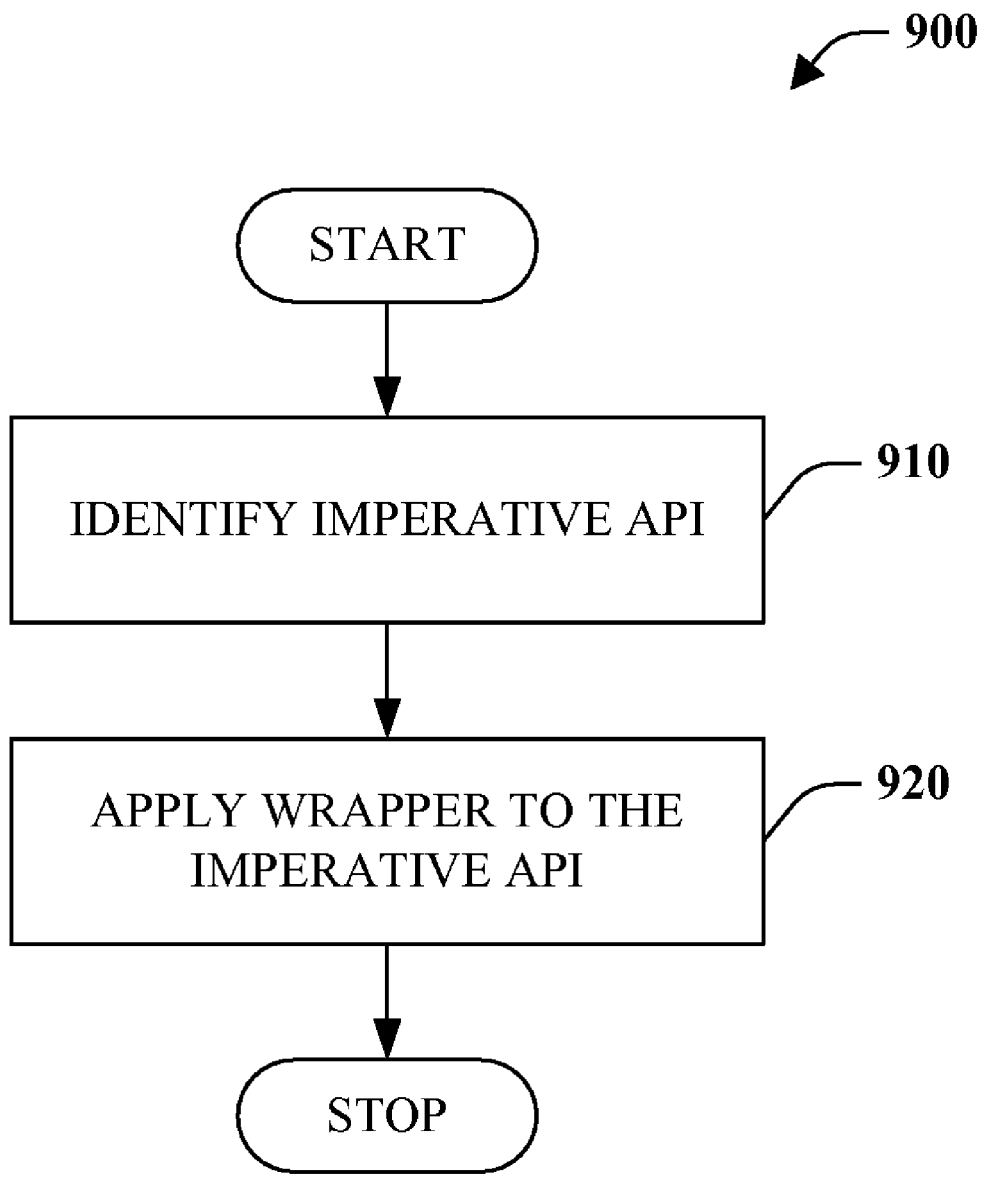
FIG. 9 is a flow chart diagram of a method providing compositional functionality with respect to an imperative API.
Figure 10:
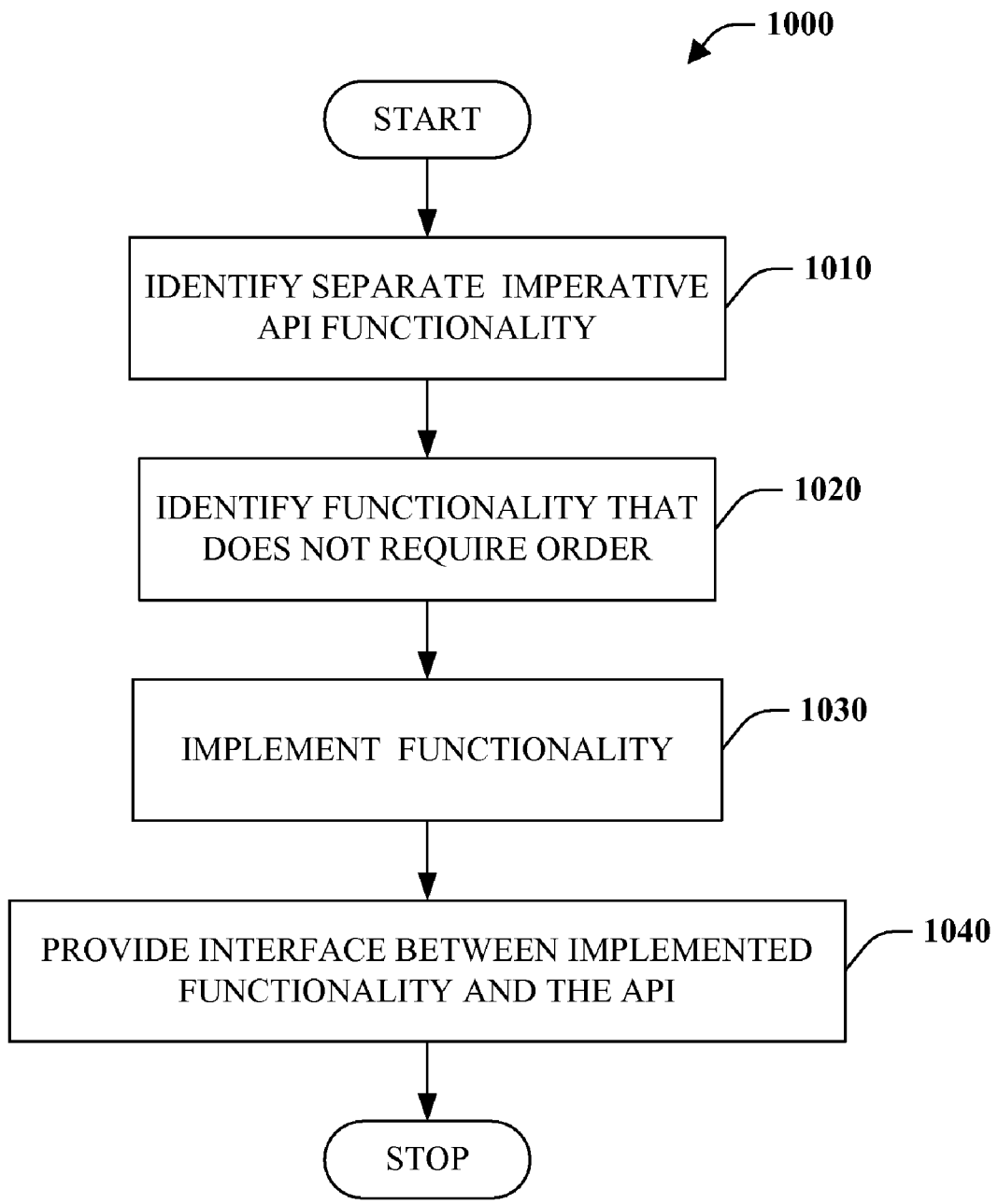
FIG. 10 is a flow chart diagram of a method of compositional wrapper generation.
Figure 11:
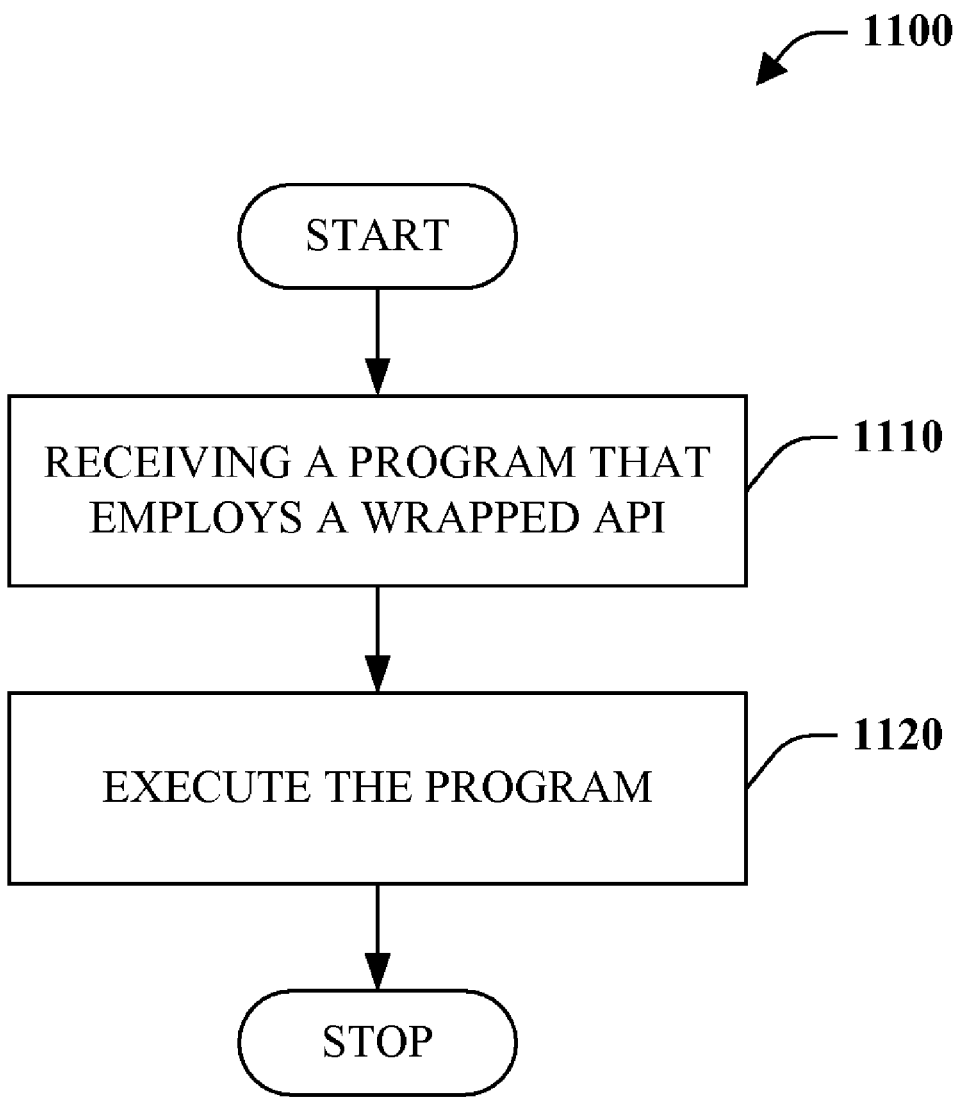
FIG. 11 is a flow chart diagram of a program methodology relating to execution of a program that references a wrapped API.

In view of the exemplary systems described supra, methodologies that may be implemented in accordance with the disclosed subject matter will be better appreciated with reference to the flow charts of FIGS. 9-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 9, a method of providing compositional functionality with respect to an imperative API 900 is depicted in accordance with an aspect of this disclosure. In particular, an imperative API can be identified at reference numeral 910. For example, such an API can provide functionality with respect to code generation. At reference numeral 920, a wrapper can be applied to the imperative API. The wrapper can provide a compositional interface or view to the imperative API. More specifically, code can be provided with respect to at least a portion of functionality provided by the imperative API to enable calls to be made independent of other calls thereby increasing code modularity and composability as well as independence.

FIG. 10 is a flow chart diagram depicting a method 1000 of compositional wrapper generation. At reference numeral 1010, separate imperative API functionality is identified. In this act, mixed API functionality can be decoupled. For example, object specification and object building can be identified as functionality associated with a code generation API. At numeral, 1020, functionality that does not strictly require ordering can be identified. The identified functionality that does not require ordering can be implemented in more independent manner at numeral 1030. For example, object specification or composition can be implemented. At reference 1040, an interface is provided between the implemented functionality and the imperative API. For example, implemented functionality can be called as required by the imperative API.

FIG. 11 illustrates a programming methodology 1100 in accordance with an aspect of the claimed subject matter. At reference numeral 1110, a program is received or otherwise acquired that utilizes a wrapped API. For example, the program can be a code generation application that employs a compositionally wrapped imperative API. In this manner, at least some functionality can be specified independently and/or in an arbitrary order. For example, programmatic elements can be constructed in an arbitrary manner such as top-down, bottom-up or some hybrid thereof. Relationships between elements can be provided concurrently with construction or subsequently thereto. It should also be appreciated that the program can include code literals and/or graphical literals. At numeral 1120, the program is executed. In the code generation scenario, execution will result in generation of another program. It should be appreciated that execution can include compilation or interpretation of the program prior to actual execution of instructions. For example, serialized literals may need to be retrieved/deserialized from a data store, types inferred and/or unquoted literal portions resolved.

The following is a detailed example relating to portions of the claimed subject matter to further facilitate clarity and understanding. What follows is purely exemplary and is not meant to limit the claimed subject matter. In particular, the example illustrates application of a few of the aforementioned aspects of the disclosure with respect to a conventional imperative API for code generation.

Figure 12:
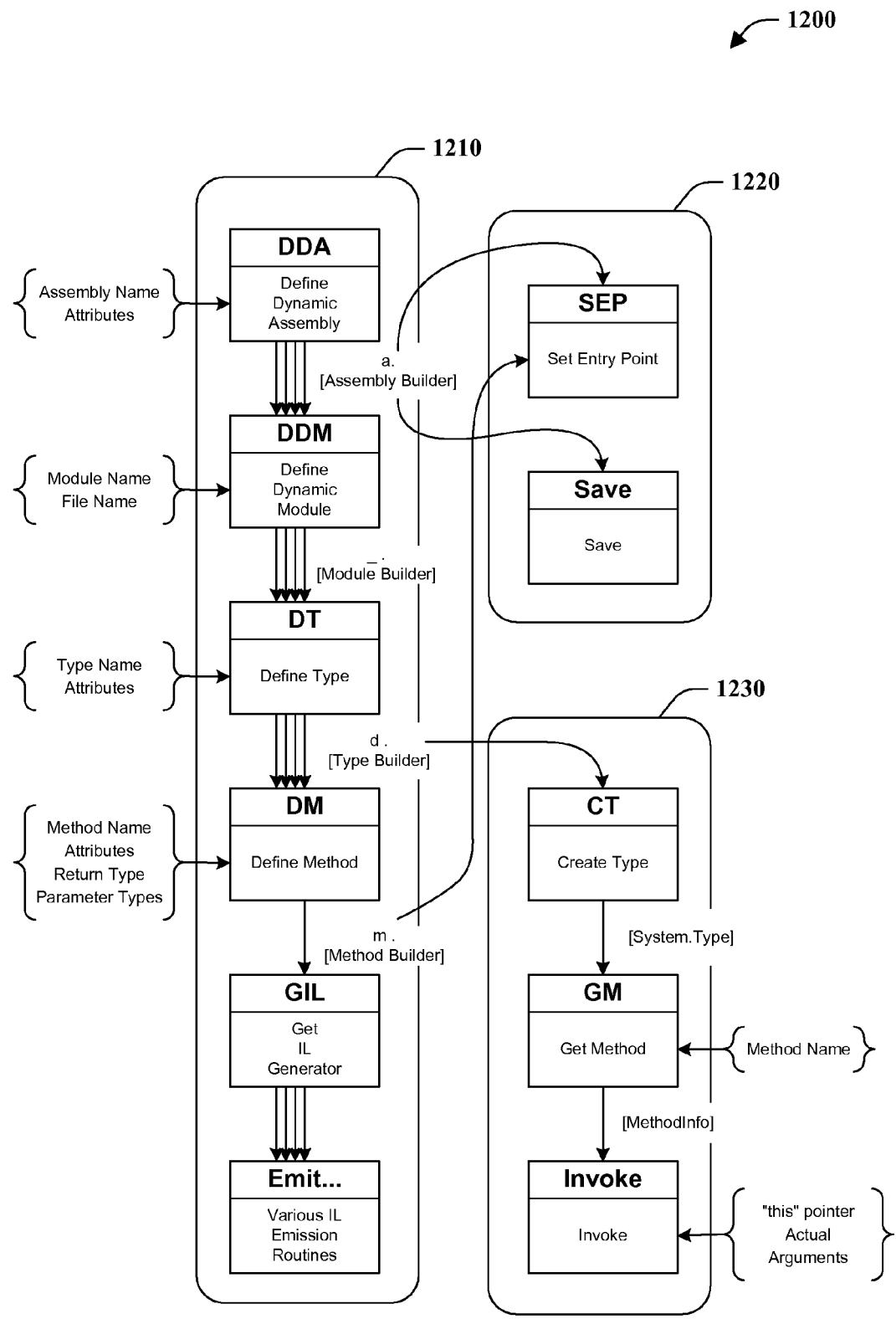
FIG. 12 is a graphical depiction of an exemplary imperative API.

Referring to FIG. 12, a graphical illustration of a code generation API 1200 is provided. As shown, the code generation includes three distinct groups of calls 1210, 1220 and 1230. Group 1210 supplies calls for creating code in methods, types, modules and an assembly. Group 1220 provides calls for saving an assembly to a file for later execution, and group 1230 affords calls for executing methods dynamically. As shown, the API 1200 is imperative in that it requires a rigid, sequence of calls. In other words, an author of a code generator must call the API in a top-down manner that creates an assembly before calling an API that creates modules, before calling an API that creates types, and so on. However, since any bottom level statement or expression can refer to any other type or member, whether nested or not, the sequence required by the API is not logically necessary. In fact, it is tailored to the convenience of the author of the API rather than to its user, who authors a code generator.

The author of the code generation API must ensure that whatever a user does the generated assembly has the required nested structure. The easiest way to do this is to force the user to create things in sequence. However, the final assembly is both a network of cross references and a nested structure of containers. The user of the API, the author of a code generator, must specify both the network of references and the nested structure of containers. Specifying the network of cross references or declarations does not logically require sequential calls, but is done most naturally in a bottom up fashion.

The following code snippet provides an example of usage of API 1200 to generate another program that prints "hello world:"

```
With Thread.GetDomain.DefineDynamicAssembly(New
AssemblyName("HWAsbly"), _
    AssemblyBuilderAccess.RunAndSave)
  Dim mtdBld As MethodBuilder
  With .DefineDynamicModule("HW", "HW.exe").DefineType("HWT",
TypeAttributes.Public)
    mtdBld = .DefineMethod("Main", MethodAttributes.Static Or _
      MethodAttributes.Public, GetType(Void), Nothing)
    With mtdBld
      With .GetILGenerator
        .EmitWriteLine("hello, world")
```

There are hardly any options for re-ordering or refactoring the above code. The "With" statement emphasizes the nesting structure implied by the required sequence of calls, whilst avoiding temporary variables. The nesting structure via "With" is a direct depiction of the nesting in the ultimately generated code. Notice, however, that the "Methodbuilder," "mtdBld" is an exception. Since it is used in several levels of the nested structure, there needs to be a temporary variable for it.

What follows is a functionally identical rewrite of the code above in a more functional style, avoiding the "With" statement and introducing temporary variables at every level of the sequence. This makes the required sequence crystal clear at the expense of reflecting the implied nesting structure:

```
Dim asmNym = New AssemblyName("HWAsbly")
Dim hwaBld As AssemblyBuilder =
  Thread.GetDomain.DefineDynamicAssembly(asmNym, _Assembly-
    BuilderAccess.RunAndSave)
Dim mdlBld As ModuleBuilder = hwaBld.DefineDynamicModule("HW",
  "HW.exe")
Dim tpeBld As TypeBuilder = mdlBld.DefineType("HWT",
  TypeAttributes.Public)
Dim mtdBld As MethodBuilder = tpeBld.DefineMethod("Main",
  MethodAttributes.Static Or _MethodAttributes.Public,
    GetType(Void), Nothing)
Dim ilGntr As ILGenerator = mtdBld.GetIlGenerator
ilGntr.EmitWriteLine("hello, world")
ilGntr.Emit(OpCodes.Ret)
Dim theTpe As System.Type = tpeBld.CreateType
theTpe.GetMethod("Main").Invoke(Nothing, Nothing)
hwaBld.SetEntryPoint(mtdBld, PEFileKinds.ConsoleApplication)
hwaBld.Save("HW.exe")
```

The "AssemblyBuilder" must exist before the "ModuleBuilder" can be created, which must exist before the "TypeBuilder" can be created, which must exist before the "MethodBuilder" can be created, which must exist before the "ILGenerator" can be created, which must exist before any code can be generated.

The above code is now discussed line by line for purposes of clarity. First, a name is created for the assembly about to be created:
Dim asmNym=New AssemblyName("HWAsbly")
Next, in the current thread and application domain, a dynamic "AssemblyBuilder" is created with permissions to run code in it dynamically, that is, right now, and with permission to save the generated assembly for later execution:

```
Dim hwaBld As AssemblyBuilder =
  Thread.GetDomain.DefineDynamicAssembly(asmNym, _Assembly-
    BuilderAccess.RunAndSave)
```

Next, using an instance method of the "AssemblyBuilder hwaBld," a dynamic "ModuleBuilder" is created with the name "HW" and ultimately storable in the file "HW.exe:"

```
Dim mdlBld As ModuleBuilder = hwaBld.DefineDynamicModule("HW",
  "HW.exe")
```

Then, using an instance method of the "ModuleBuilder mdlBld," a "TypeBuilder" is created for a public class named "HWT:"

```
Dim tpeBld As TypeBuilder = mdlBld.DefineType("HWT",
  TypeAttributes.Public)
```

Next, using an instance method of the "TypeBuilder tpeBld," a "MethodBuilder" is created for a static, public method named "Main" which takes no arguments and returns nothing:

```
Dim mtdBld As MethodBuilder = tpeBld.DefineMethod("Main",
  MethodAttributes.Static Or
    MethodAttributes.Public, GetType(Void), Nothing)
```

Subsequently, using an instance method of the "MethodBuilder mtdBld," an "ILGenerator" is created, with which code can be emitted into the method body:
Dim ilGntr As ILGenerator=mtdBld.GetIlGenerator
Next, the "ILGenerator" is used to emit code that will, when called dynamically or at another time via a stored assembly, write a line of text to the console and return:

```
ilGntr.EmitWriteLine("hello, world")
ilGntr.Emit(OpCodes.Ret)
```

After that, the generated code is tested by loading the type via the "TypeBuilder's CreateType" instance method, getting the type's "Main" method, and invoking "Main" with "Nothing" as the this (instance) parameter—since "Main" is a static or shared method—and with no additional parameters, that is, with "Nothing" for the array of non-this parameters:

```
Dim theTpe As System.Type = tpeBld.CreateType
theTpe.GetMethod("Main").Invoke(Nothing, Nothing)
```

Finally, the generated assembly is saved to a file, "HW.exe," the required entry point to the Main routine is set and the assembly is specified as a console application. Note that, in this scenario, the saved-file name here should match the name specified above in the call of "DefineDynamicModule." In other scenarios, there may be multiple modules (e.g., .exe and .dll files) in the assembly, explaining why there are two places to insert file names. This resulting output file is an executable assembly that can be executed later any number of times:

```
hwaBld.SetEntryPoint(mtdBld, PEFileKinds.ConsoleApplication)
hwaBld.Save("HW.exe")
```

Although there are few options, concerns can be separated into concerns of declaring things, which does not logically require a sequence, and building things, which does. For the first part of the job, a factory pattern can be employed. Generally, factories are objects that hold declaration information and wait for one more required input before constructing a builder. The builders actually generate code and need to be called in the required sequence. The factories are new things; the builders (e.g., module, type, method, expression . . . ) are the existing things associated with the API. Consider the following where new types and constructors are italicized:
REM Unsequenced code—these calls may be made in any order

```
Dim xpr As ExpressionFactory = New
  StaticMethodCallFactory("Console.WriteLine", _"hello,
    world")
REM Any method call is a kind of Expression, therefore, its factory
REM is a subclass of ExpressionFactory
Dim mtd = New MethodFactory("Main", MethodAttributes.Static Or
  MethodAttributes.Public, _
    GetType(Void), Nothing)
Dim mdl = New ModuleFactory("HW", "HW.exe")
Dim tpe = New TypeFactory("HWT", TypeAttributes.Public)
Dim asmNym = New AssemblyName("HWAsbly")
Dim hwaBld As AssemblyBuilder =
  Thread.GetDomain.DefineDynamicAssembly(asmNym, _Assembly-
    BuilderAccess.RunAndSave)
```

REM Rigidly sequenced code, exactly the same sequence as before, but threading through
REM the particular artifacts implied above via hwaBld, mdl, tpe, mtd, and xpr

```
Dim mdlBld As ModuleBuilder = mdl.MakeBuilder(hwaBld)
Dim tpeBld As TypeBuilder = tpe.MakeBuilder(mdlBld)
Dim mtdBld As MethodBuilder = mtd.MakeBuilder(tpeBld)
Dim xprBld As ExpressionBuilder = xpr.MakeBuilder(mtdBld)
xprBld.Emit( )
tpeBld.CreateType.GetMethod("Main").Invoke(Nothing, Nothing)
hwaBld.SetEntryPoint(mtdBld, PEFileKinds.ConsoleApplication)
hwaBld.Save("HW.exe")
```

What is obtained here is the ability to declare "Methods," "Modules," "Types," and "Code" independently of building the output assembly. The final building process, encapsulated in the "MakeBuilder" calls, will resolve all cross references and create a self-contained output assembly.

Notice above that while emphasizing decoupling, improvement was added to the conventional API 1200. Instead of writing intermediate language code, an "ExpressionFactory" and "ExpressionBuilder" were created to express generated code. Instead of generating intermediate language code that calls Console.WriteLine which is:

```
ilGntr.EmitWriteLine("hello, world")
ilGntr.Emit(OpCodes.Ret),
``` which is really shorthand, for the much more verbose

```
ilGntr.Emit(OpCodes.ldstr, _
    myModule.ResolveString(myHelloWorldStringToken))
ilGntr.EmitCall(OpCodes.[Call],
    myModule.ResolveMember(myConsoleWriteLineMethodToken),
    Nothing),
``` it can be stated that one desires to generate or emit a call to the static method Console.WriteLine very directly:

```
Dim xpr As ExpressionFactory = New
    StaticMethodCallFactory("Console.Writeline", _
        "hello, world")
...
Dim xprBld As ExpressionBuilder = xpr.MakeBuilder(mtdBld)
```

This can be improved further if a compiler or like component can identify a desired expression. This is easy since that is exactly what it does with code users write. Still further improvement can be made if the compiler or like component can be directed to look at code desired to be generated. This can be accomplished via quasiquote-unquote type technique, which transforms specially quoted code into calls of the factory constructors. For example, the following can be written to mean exactly the same thing as above:

```
Dim xpr As ExpressionFactory = [Console.Writeline("hello, world")] ...
Dim xprBld As ExpressionBuilder = xpr.MakeBuilder(mtdBld)
```

Further, type inference can be employed to set the static type of the variable "xpr" to "ExpressionFactory" implicitly. Accordingly, the code can simply be specified as:

Dim xpr=[Console.Writeline("hello, world")]

The compiler or like component can inspect the content of the quotes, determine it is a call to a static method, and replace the quoted expression with the appropriate call to the "StaticMethodCallFactory" constructor.

Such a technique can be employed more extensively as follows:

```
Dim mtd = [Public Static Sub Main( )
    Console.WriteLine("hello, world")
End Sub]
```

Here, type inference would conclude that the static type of "mtd" is "MethodFactory." With compiler support, there is enough information to rewrite the syntax above as follows:

```
Dim xprs As New List(Of ExpressionFactory)
xprs.Add( [Console.Writeline("hello, world") ])
Dim mtd = New MethodFactory("Main", _
    MethodAttributes.Static Or MethodAttributes.Public, _
    GetType(Void), Nothing, xprs)
```

The last line would be an overloaded constructor of "MethodFactory," one that takes a list of expression factories as an input. Prior to that, would be construction of a list of expression factories that, recursively, calls the constructors of "ExpressionFactory" through quoted-code syntax. After recursive application of the compiler to look for quoted code, the above becomes:

```
Dim xprs As New List(Of ExpressionFactory)
xprs.Add(New StaticMethodCallFactory("Console.Writeline", _
    "hello, world"))
Dim mtd = New MethodFactory("Main", _
    MethodAttributes.Static Or MethodAttributes.Public, _
    GetType(Void), Nothing, xprs)
```

At this point, there is no more special syntax, and the original quoted method declaration is fully replaced with calls to factory constructors. Notice that the temporary variable "xpr" has been eliminated because the call to "StaticMethodCallFactory" is substituted in-line. This illustrates the superior composability of the compositional API, allowing not only the user but also the compiler to weave code-generation code together in sophisticated ways.

This can further be extended with respect to class as follows:

```
Dim typ = [Public Class HWT
    Public Static Sub Main( )
        Console.WriteLine("hello, world")
    End Sub
End Class ]
```

As before, there is enough information available here for the compiler to rewrite this as follows:

```
Dim mtds As New List(Of MethodFactory)
    mtds.add([Public Static Sub Main( )
        Console.WriteLine("hello, world")
    End Sub ])
    Dim tpe = New TypeFactory("HWT", TypeAttributes.Public, mtds)
```

In turn, this can be rewritten as:

```
Dim xprs As New List(Of ExpressionFactory)
    xprs.Add( [Console.Writeline("hello, world") ])
    Dim mtds As New List(Of MethodFactory)
    mtds.add(New MethodFactory("Main", _
        MethodAttributes.Static Or MethodAttributes.Public, _
        GetType(Void), Nothing, xprs))
    Dim tpe = New TypeFactory("HWT", TypeAttributes.Public, mtds)
```

This can then be rewritten as:

```
Dim xprs As New List(Of ExpressionFactory)
    xprs.Add(New StaticMethodCallFactory("Console.Writeline", _
        "hello, world"))
    Dim mtds As New List(Of MethodFactory)
    mtds.add(New MethodFactory("Main", _
        MethodAttributes.Static Or MethodAttributes.Public, _
        GetType(Void), Nothing, xprs))
    Dim tpe = New TypeFactory("HWT", TypeAttributes.Public, mtds)
```

This assumes that the compiler will generate temporary variables for lists of factories (such may be replaceable via object-initializer syntax).

This is the highest abstraction that should be employed with quote syntax, since the subject language used in this example (e.g., Visual Basic) has no intrinsic syntax for modules and assemblies. Accordingly, it makes little sense to try to define a quoted syntax for them. However, given a different language this is possible and within the scope of the subject innovation.

One sub-feature remains for quoted code, namely unquoting or splicing. Suppose one did not want to commit to the name of the method, rather allowing a user to input it when running the code-generator. In this scenario, the code could be written as follows:

```
Dim typ = [Public Class HWT
    Public Static Sub ⌊ Console.ReadLine( ) ⌋ ( )
        Console.WriteLine("hello, world")
    End Sub
End Class ]
```

In this context, the unquote brackets (e.g., "⌊" and "⌋") mean substitute the run-time value of the enclosed expression into the quoted code and continue. If the type of the unquoted expression happens to be one of the factories, the compiler can rewrite the code appropriately, as follows:

```
Dim xpr = [Console.WriteLine("hello, world") ]
    Dim typ = [Public Class HWT
    Public Static Sub ⌊Console.ReadLine( )⌋( )
```

```
        ⌊ xpr ⌋
    End Sub
End Class ]
```

If the type of the unquoted expression is "IEnumerable(Of Factory)", then the compiler should generate code to splice the results into enclosing quoted code, as follows:

```
Dim xprs As New List of ExpressionFactory
    xprs.Add([Console.WriteLine("hello, world") ])
    xprs.Add([Console.Write("Press any key to end this program ...") ])
    xprs.Add([Console.ReadKey( )])
    Dim typ = [Public Class HWT
    Public Static Sub ⌊Console.ReadLine( )⌋ ( )
        ⌊xprs ⌋
    End Sub
End Class ]
```

At run-time, this becomes some internal representation equivalent to the following:

```
Dim typ = [Public Class HWT
    Public Static Sub ⌊Console.ReadLine( )⌋ ( )
        Console.WriteLine("hello, world")
        Console.Write("Press any key to end this program ...")
        Console.ReadKey( )
    End Sub
End Class ]
```

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 13:
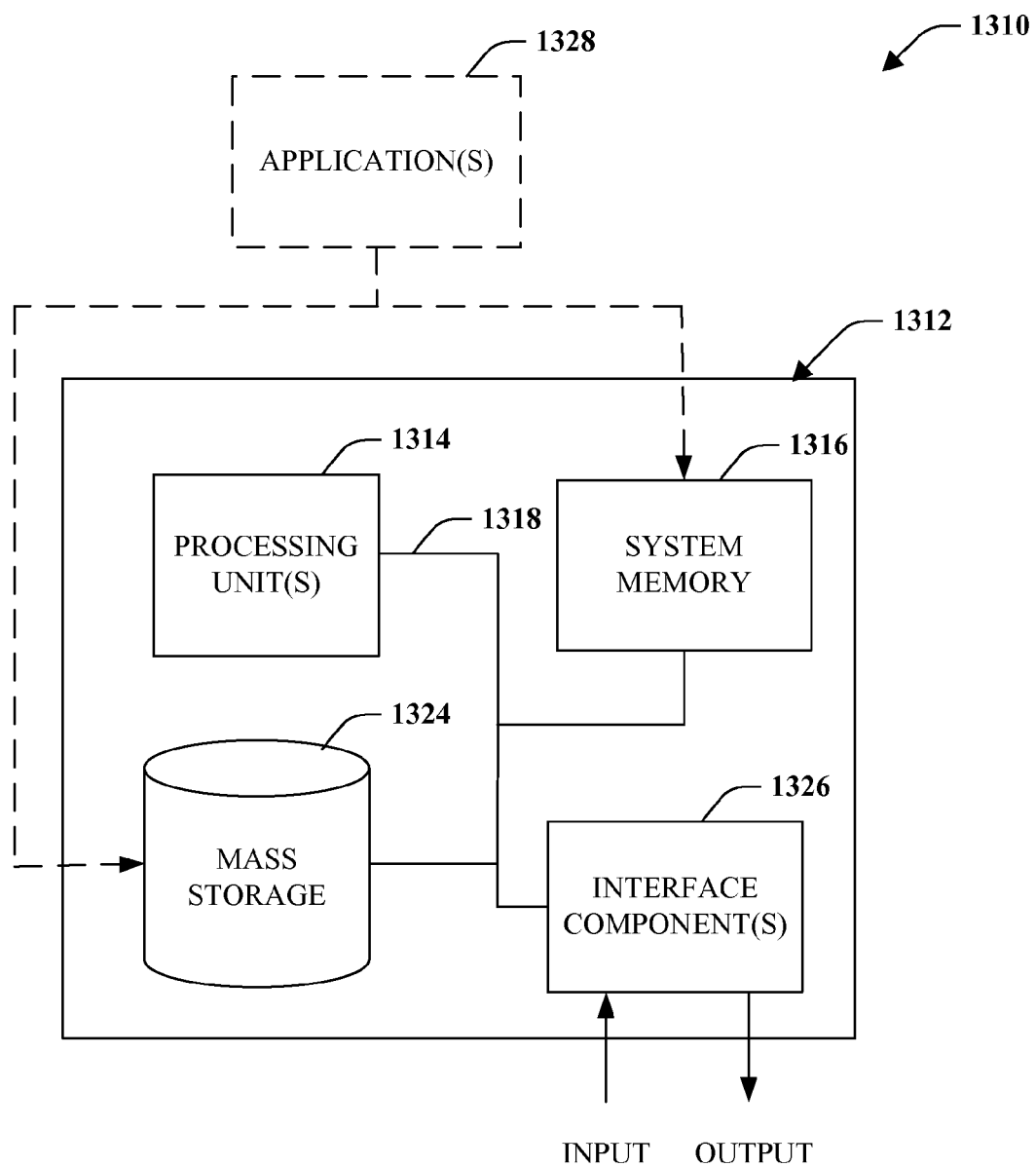
FIG. 13 is a schematic block diagram illustrating a suitable operating environment for aspects of the subject disclosure.
Figure 14:
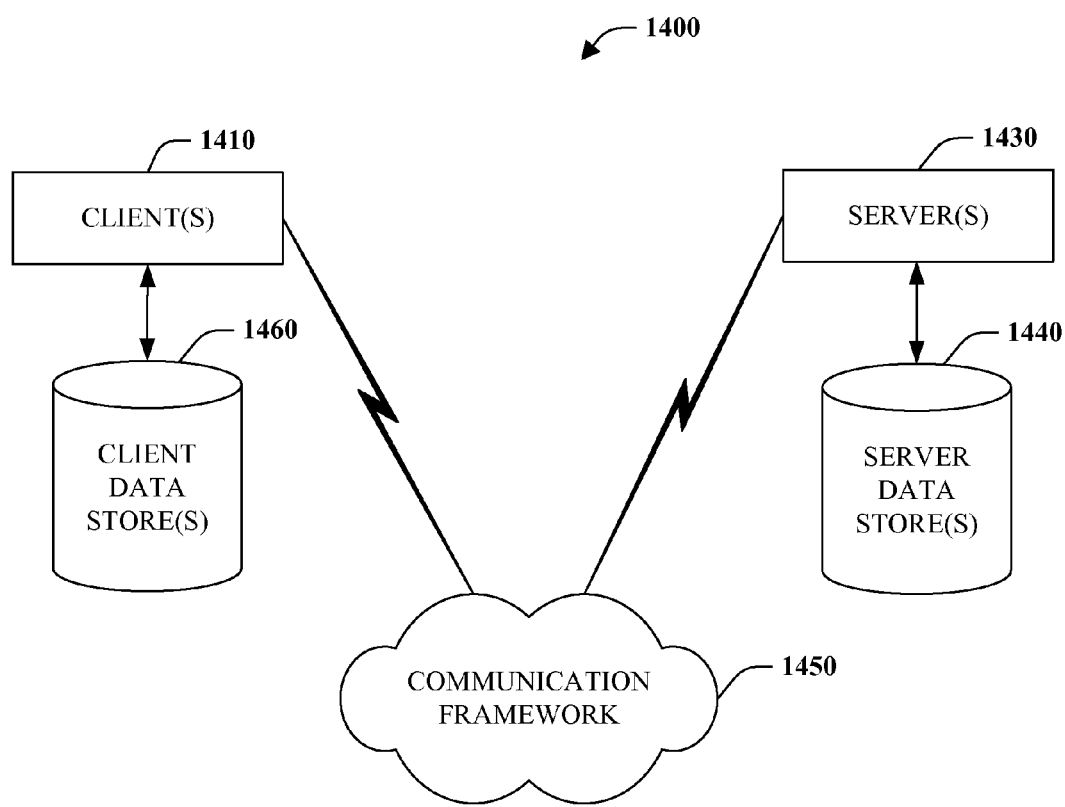
FIG. 14 is a schematic block diagram of a sample-computing environment.

In order to provide a context for the various aspects of the disclosed subject matter, FIGS. 13 and 14 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 13, an exemplary environment 1310 for implementing various aspects disclosed herein includes a computer 1312 (e.g., desktop, laptop, server, hand held, programmable consumer or industrial electronics . . . ). The computer 1312 includes a processing unit 1314, a system memory 1316 and a system bus 1318. The system bus 1318 couples system components including, but not limited to, the system memory 1316 to the processing unit 1314. The processing unit 1314 can be any of various available microprocessors. It is to be appreciated that dual microprocessors, multi-core and other multiprocessor architectures can be employed as the processing unit 1314.

The system memory 1316 includes volatile and nonvolatile memory. The basic input/output system (BIOS), containing the basic routines to transfer information between elements within the computer 1312, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1312 also includes removable/non-removable, volatile/non-volatile computer storage media. FIG. 13 illustrates, for example, mass storage 1324. Mass storage 1324 includes, but is not limited to, devices like a magnetic or optical disk drive, floppy disk drive, flash memory or memory stick. In addition, mass storage 1324 can include storage media separately or in combination with other storage media.

FIG. 13 provides software application(s) 1328 that act as an intermediary between users and/or other computers and the basic computer resources described in suitable operating environment 1310. Such software application(s) 1328 include one or both of system and application software. System software can include an operating system, which can be stored on mass storage 1324, that acts to control and allocate resources of the computer system 1312. Application software takes advantage of the management of resources by system software through program modules and data stored on either or both of system memory 1316 and mass storage 1324.

The computer 1312 also includes one or more interface components 1326 that are communicatively coupled to the bus 1318 and facilitate interaction with the computer 1312. By way of example, the interface component 1326 can be a port (e.g., serial, parallel, PCMCIA, USB, FireWire . . . ) or an interface card (e.g., sound, video, network . . . ) or the like. The interface component 1326 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1312 to output device(s) via interface component 1326. Output devices can include displays (e.g., CRT, LCD, plasma . . . ), speakers, printers and other computers, among other things.

FIG. 14 is a schematic block diagram of a sample-computing environment 1400 with which the subject innovation can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing the aspects of the subject innovation, for example. One possible communication between a client 1410 and a server 1430 may be in the form of a data packet transmitted between two or more computer processes.

The system 1400 includes a communication framework 1450 that can be employed to facilitate communications between the client(s) 1410 and the server(s) 1430. The client(s) 1410 are operatively connected to one or more client data store(s) 1460 that can be employed to store information local to the client(s) 1410. Similarly, the server(s) 1430 are operatively connected to one or more server data store(s)

1440 that can be employed to store information local to the servers 1430. For example, programmers on client(s) 1410 can request and receive APIs or the like from server(s) 1430 or vice versa. Additionally or alternatively, generated code can be distributed across both client(s) 1410 and server(s) 1430.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A computer-readable storage medium having computer-executable components stored thereon, the computer-executable components comprising:
    an imperative application programming interface (API); and
    a wrapper component configured to provide a compositional interface to the imperative API to enable expressions of the imperative API to be declared via the wrapper component in an order restricted by the imperative API, the wrapper component further configured to facilitate generating the expressions by reordering a calling of the expressions from the order restricted by the imperative API to a manner acceptable with the imperative API
    a constructor component configured to enable context free element instance declaration, wherein the constructor component is configured to capture element declarations as functions that accept context.

2. The computer-readable storage medium of claim 1, at least one element is declared in a literal syntax.

3. The computer-readable storage medium of claim 1, the at least one element is declared as a code literal.

4. The computer-readable storage medium of claim 1, a portion of the code literal references a value from its programming environment.

5. The computer-readable storage medium of claim 1, the at least one element is declared as a graphical literal.

6. The computer-readable storage medium of claim 1, further comprising a context component configured to link an element to a context as a function of a relation to one or more other elements.

7. The computer-readable storage medium of claim 1, wherein the imperative API is configured to provide functionality for code generation applications.

8. The computer-readable storage medium of claim 7, wherein the wrapper component is configured to separate object declaration from object building.

9. A computer programming method, comprising;
    receiving a program specified with aid from a compositional wrapping of an imperative application programming interface (API), wherein the compositional wrapping facilitates a generation of expressions by reordering a calling of the expressions from an order restricted by the imperative API to a manner acceptable with the imperative API
    using a constructor component enabling context free element instance declaration, wherein the constructor component is configured to capture element declarations as functions that accept context; and
    executing the program to generate another program.

10. The method of claim 9, further comprising receiving specification of programmatic elements independent of other functionality.

11. The method of claim 10, further comprising receiving code that links a plurality of independently specified programmatic elements together.

12. The method of claim 11, further comprising employing functionality provided by the imperative API to build program constructs in accordance with a sequence imposed by the imperative API.

13. The method of claim 10, further comprising receiving specification of at least one programmatic element that employs a code literal.

14. The method of claim 13, further comprising receiving specification of at least one programmatic element that employs a code literal that includes reference to an environmental value.

15. The method of claim 13, further comprising inferring a type associated with the code literal.

16. The method of claim 13, further comprising deserializing a code literal from a data store.

17. A computer-readable storage medium, comprising:
    computer-readable instructions, the computer-readable instructions including instructions for causing at least one processor to perform the following acts:
        providing programmatic support for code generation that separates object declaration from object building, wherein the providing comprises converting an imperative application programming interface (API) into a compositional API to facilitate generating expressions by reordering a calling of the expressions from an order restricted by the imperative API to a manner acceptable with the imperative API
        using a constructor component enabling context free element instance declaration, wherein the constructor component is configured to capture element declarations as functions that accept context; and
        specifying code to be generated literally.

18. The computer-readable storage medium of claim 17, the computer-readable instructions further comprising instructions for causing at least one processor to perform the following acts:
    declaring objects without context; and
    linking objects to context.

* * * * *